United States Patent [19]
Ort

[11] Patent Number: 4,459,599
[45] Date of Patent: Jul. 10, 1984

[54] DRIVE CIRCUIT FOR A DROP-ON-DEMAND INK JET PRINTER

[75] Inventor: Donald L. Ort, Dallas, Tex.

[73] Assignee: Xerox Corporation, Stamford, Conn.

[21] Appl. No.: 403,261

[22] Filed: Jul. 29, 1982

[51] Int. Cl.³ .............................................. G01D 15/18
[52] U.S. Cl. ................................. 346/140 R; 310/317
[58] Field of Search .................... 346/140 R, 140 PD; 310/317

[56] References Cited

U.S. PATENT DOCUMENTS

| | | | |
|---|---|---|---|
| 3,739,299 | 6/1973 | Adler | 310/317 |
| 3,902,083 | 8/1975 | Zoltan | 310/8.1 |
| 4,126,867 | 11/1978 | Stevenson, Jr. | 346/140 R |
| 4,184,168 | 1/1980 | Isayama et al. | 346/140 R |
| 4,216,483 | 8/1980 | Kyser et al. | 346/140 R |
| 4,245,224 | 1/1981 | Isayama et al. | 346/75 |
| 4,266,232 | 5/1981 | Juliana, Jr. et al. | 346/140 R |
| 4,282,535 | 8/1981 | Kern et al. | 346/140 R |
| 4,284,996 | 8/1981 | Greve | 346/140 R |
| 4,300,144 | 11/1981 | Isayama et al. | 346/140 R |

*Primary Examiner*—Reinhard J. Eisenzopf
*Assistant Examiner*—Mark Reinhart
*Attorney, Agent, or Firm*—Richard A. Tomlin

[57] ABSTRACT

A drive circuit for a drop-on-demand ink jet printer utilizes the inherent capacitance of the driver electromechanical transducer to store at least a portion of the voltage required for droplet ejection. The drive circuit includes circuitry for sensing and terminating, for example, rapid discharge of the electrical potential difference across the electromechanical transducer during jet firing.

10 Claims, 7 Drawing Figures

FIG. 3
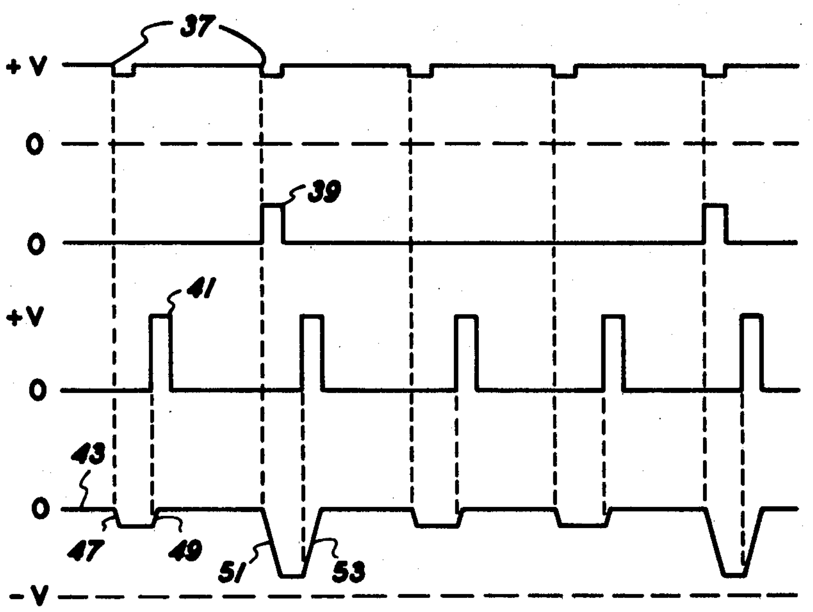
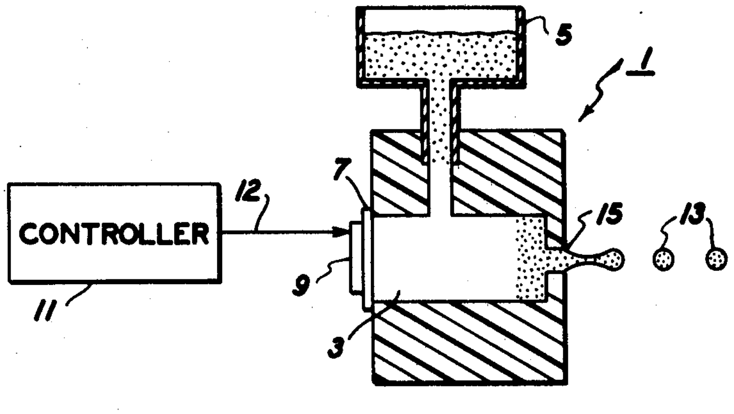
FIG. 1

DRIVE CIRCUIT FOR A DROP-ON-DEMAND INK JET PRINTER

This invention relates to an improved drive circuit for a drop-on-demand ink jet ejector.

Drop-on-demand ink jet ejectors are well known in the art, commercial units being available. Drop-on-demand ink jet printers eject droplets only when required by the image to be formed. Conventionally, ink is contained in a chamber, the chamber including inlet means to supply ink and an exit orifice through which ink droplets are expelled. The ink is held in the chamber by utilizing an orifice small enough for the surface tension of the ink to prevent the ink from running out. One wall of the chamber is provided with a flexible membrane, which is in contact with the ink. A piezoelectric transducer is bonded to the free surface of the flexible membrane in such a manner that when the transducer is "fired", it pushes against the membrane causing the membrane to compress the ink sufficiently to eject an ink droplet.

In practice these electromechanical transducer-driven ink jet ejectors are operated at very high rates, 10,000 to 15,000 droplets per second not being unusual. A typical drive circuit for an ink jet ejector is shown in U.S. Pat. No. 4,216,483, issued Aug. 5, 1980.

The invention as claimed is intended to provide a more efficient drive circuit than has been previously disclosed. This is accomplished primarily by using the inherent capacitance of the electromechanical transducer as a storage device to retain a significant portion of the voltage required to fire the jet. This advantage and others will become apparent upon consideration of the disclosure and particularly when taken in conjunction with the accompanying drawing wherein:

FIG. 1 is a schematic representation in partial cross section of a drop-on-demand ink jet ejector.

FIG. 3 is a diagram showing the time relationship between the various electrical pulses, including the drive pulse of this invention.

Figure 2:
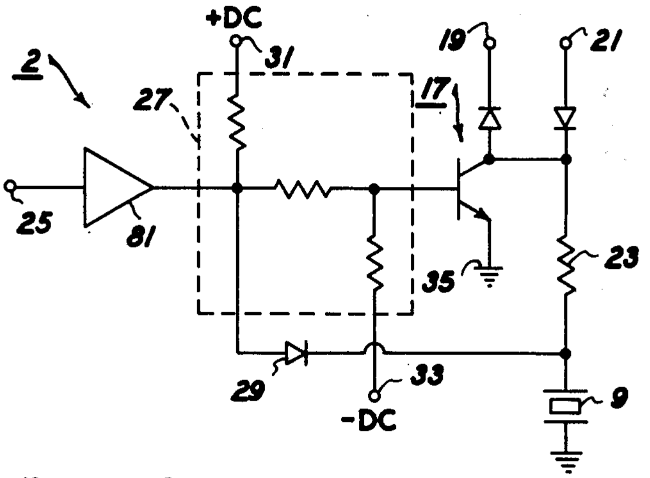
FIG. 2 is a circuit diagram for a preferred drive circuit embodiment of this invention.

Referring now to FIG. 1, there is seen a simplified ink jet ejector 1, which comprises an ink chamber 3, an ink supply 5 connected to ink chamber 3, a flexible membrane 7 sealing one wall of ink chamber 3, an electromechanical transducer 9 bonded to flexible membrane 7, and drive pulse control means, controller 11, for the electromechanical transducer, which controller includes the drive circuit of the present invention.

In operation ink chamber 3 is continuously filled with ink supplied, for example, by gravity from ink supply 5. A drive pulse from controller 11 causes electromechanical transducer 9, acting against flexible membrane 7, to reduce the volume capacity of the ink chamber 3, thereby expelling a droplet 13 of ink from orifice 15. Typically, a number of such ejectors are combined into an array, each ejector having its own drive pulse 12, for example, from a controller 11. In U.S. Pat. No. 4,216,483, a seven-ejector array is disclosed. Much larger arrays can be provided if desired. Each jet in these arrays operates similar to that disclosed above.

As explained in U.S. Pat. No. 4,266,232, issued May 5, 1981, it is sometimes desirable to vibrate or pulse the ink meniscus in orifice 15 whenever the ejector is not ejecting a droplet, that is, when a droplet from that particular jet is not required to produce the desired image. To do this, the electromechanical transducer is pulsed at an energy level insufficient to cause the expulsion of a droplet 13 from orifice 15 but sufficient to cause perturbation or vibration of the meniscus. This perturbation has been found to improve drop size uniformity and also increases the rate at which the ejectors can be operated. The drive circuit of this invention provides this perturbation, which will be referred to hereafter as "dither".

Referring now to FIG. 2, there is seen a drive circuit, generally shown as 2, in accordance with the present invention, which includes ink jet electromechanical transducer 9. Included in the circuit 2 are a source of dither control signal pulse 19 and a source of restore control signal pulse 21. Source of dither control signal pulse 19 and restore control signal pulse 21 are common to all of the ejectors in the array. The purpose of the dither pulse is to vibrate the meniscus of the ink in orifice 15. The dither pulses can be applied during time periods when no jets would be firing, for example, during carriage return time. If the dither pulse rate is set at a frequency synchronous with the maximum firing rate, the dither can occur simultaneously with normal printing periods as is explained in U.S. Pat. No. 4,266,232. The purpose of the restore control signal pulse 21 is to restore the potential applied across electromechanical transducer 9 to its "off" potential after the dither pulse has been applied. Optional in the drive circuit is a charge/discharge resistor 23, which is used to control the shape of the charge and discharge pulse of transducer 9. In order to cause electromechanical transducer 9 to fire, the potential across the transducer 9 must be rapidly altered. This alteration in potential is provided by discharge transistor 17, which, when activated by a drive pulse applied to its base, connects electromechanical transducer 9 to ground 35. In prior art systems, such as that shown in U.S. Pat. No. 4,216,483, single-ended drivers using load resistors are a source of energy loss and heat generation. The present drive circuit 2 minimizes these losses and provides other advantages that will be disclosed herein. It is not necessary to discharge electromechanical transducer 9 completely to provide enough energy to eject a droplet 13. The drive circut 2 of the present invention utilizes that physical characteristic. To do this, a discharge control network 27 and a sensing diode 29 are incorporated in the drive circuit. Discharge control network 27 is a network of resistors connected to a source of DC potential at 31 and 33. The discharge control signal is applied to the resistor network by an open-collector logic gate 81. The operation of drive circuit 2 will now be explained in connection with FIG. 3.

FIG. 3 shows the timing relationships between the various pulses of this invention. Usually, dither control pulses 37 are applied to all jets at the highest jet repetition rate, that is, the rate at which the ejector can be efficiently operated. Each dither control pulse 37 causes a slight change in the transducer 9 differential voltage 43 as shown by line 47. The amplitude of dither control pulse 37 is selected to force a small perturbation of the ink meniscus at the ejector orifice 15 but not sufficient to cause a droplet 13 to be ejected. Shortly after each dither control pulse 37, a restore control pulse 41 is applied along a second line common to all the ejectors in the array. The purpose of this pulse is to restore the transducer differential voltage 43 as represented by line 49 to its "off" condition represented by the zero base line. Firing control pulses 39 are applied to selected ejectors in accordance with the image it is desired to produce. The firing control pulse 39 is in synchronization with the dither pulse 37. The source of firing control signal 25, as shown in FIG. 2, allows the gate output to rise turning on the discharge transistor 17. Base current to the discharge transistor 17 is supplied by the three-resistor network. Discharge of the transducer capacitance proceeds with the jet voltage being fed back to the resistor discharge control network 27 through the sensing diode 29. The resistor values are preselected such that when the transducer voltage reaches the level needed for the desired jet droplet 13 velocity, the sensing diode 29 will divert current from the resistor discharge control network 27. With this current diverted from its base, the discharge transistor 17 collector will switch to a high impedance. The discharge transistor 17 collector will then pass a current just equal to the current through the sensing diode 29 and will remain at a constant voltage. When the firing control pulse 39 in FIG. 3 is terminated, the gate output is grounded turning off the discharge transistor 17 and reverse biasing the sensing diode 29. The electromechanical transducer 9 is finally driven back to its "off" potential by the next restore control pulse 41. All control pulses (dither, fire and restore) are each longer than required to charge the transducer 9 to within an allowable tolerance of its "off" potential. The charging time is dominated by the transducer's inherent capacitance and by charge/discharge resistor 23. All sources connected to the transducer are low impedance and are operated push-pull to cause energy dissipation only during the rise and fall times. Therefore, the power requirements and heat generation are held to a minimum.

The drive circuit 2 of this invention has only a few components that need to be duplicated for each ejector, and the power dissipation is small. Therefore, it might be readily produced as a customized integrated circuit. The resistors in the discharge control network 27 could, for example, be laser trimmed to adjust them to the individual ejector characteristics if necessary; or one or more of the resistors in each discharge control network 27 could be implemented as a variable resistor outside the integrated circuit package. Most of the circuit dissipation occurs in the resistor discharge control network 27. This dissipation could be further decreased if the indicated source of DC supply is only turned on during the potential firing intervals.

In each of FIGS. 4–7, only so much of the drive circuit 2 of this invention is shown as is necessary to demonstrate how the various modifications of FIGS. 4–7 fit in to the drive circuit 2.

Figure 4:
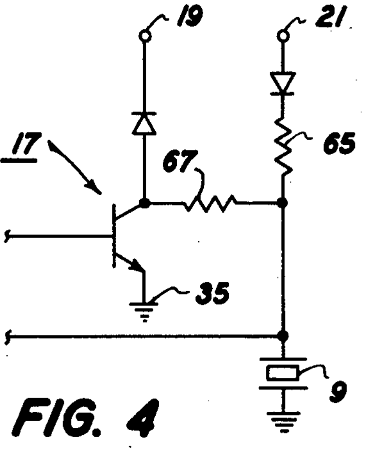
FIGS. 4–7 show modifications which, if required, can be made to the drive circuit of this invention.

Referring now to FIG. 4, there is shown a modification to the drive circuit 2. If it is desired to have different transducer pulse rise and fall times, lines 51 and 53, respectively, in FIG. 3, this can be accomplished by the provision of a separate rise time control resistor 67 and a fall time control resistor 65 in place of the single charge/discharge resistor 23 of FIG. 2.

Figure 5:
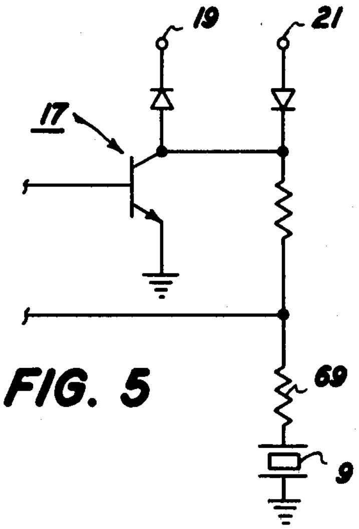

Referring now to FIG. 5, should it be found that the discharge transistor 17 turns off too slowly causing electromechanical transducer 9 to discharge more than desired, a transducer discharge limiting resistor 69 may be incorporated in the circuit as shown.

Figure 6:
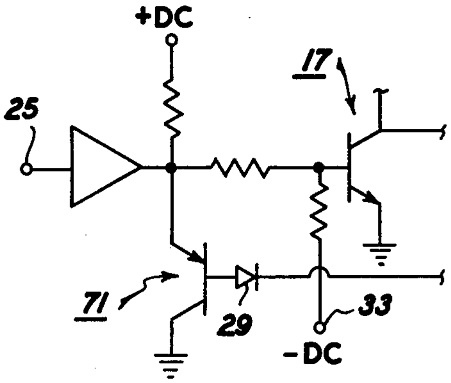

Referring now to FIG. 6, should it be desirable to have the electromechanical transducer 9 discharge be controllable over a very wide range, a feedback gain transistor 7 may be incorporated as shown.

Figure 7:
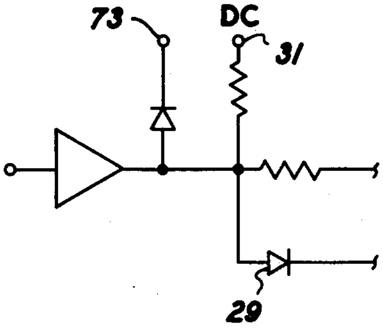

Referring now to FIG. 7, should there be a necessity to protect the collector gate from large electromechanical transducer 9 driving voltages, a voltage limiter 73 can be provided. An obvious extension of the drive circuit, which is not illustrated, would provide more than one gate as input to the control resistor network. These additional gates could be used to modify the amplitudes of particular drive pulses as might be desired for controlling first drop velocity, for example.

The advantages or distinguishing features of the drive circuit of this invention are many. For example, the ejector driver pulse 39 is applied in a push-pull manner, eliminating the power loss normally encountered in the dropping resistor of prior art single ended driver systems. The electromechanical transducer 9 capacitance serves to store voltage between pulses. The width of the ejector firing pulse as shown in FIG. 3 is set by the time delays between the various pulses, not by the width of the inputs. The input signals need only last long enough to charge or discharge the electromechanical transducer 9. The dither and restore pulse drivers are common to all ejectors in the array, which significantly reduces circuit complexity and cost. One terminal of all ejector transducers 9 is held at a common voltage, which may be fixed or variable. This may be used to bias transducer types, which operate to expel drops in the relaxed or zero voltage condition, or to apply a common signal to all jets, such as might be needed for cleaning or deaerating. The transducer voltage used to fire each ejector is individually adjustable and is not sensitive to control pulse widths, amplitudes or delays. The adjustment network for each ejector is followed by a transistor switch. This isolates the network from the large transducer currents and allows the drive circuit 2 to be configured with low power components. The switch also dissipates little power. Therefore, the method is well suited to custom integration of the ejector drivers.

Although the present invention has been disclosed in connection with preferred embodiments, it is to be understood that the invention is entitled to the protection as described in the appended claims.

What is claimed is:

1. A drop-on-demand ink jet ejector which comprises:

(a) an ink chamber;
(b) means for supplying ink to said ink chamber;
(c) an exit orifice in said ink chamber;
(d) an electromechanical transducer provided in operating relationship to ink contained in said ink chamber;
(e) drive circuit means for applying an electrical potential difference across said electromechanical transducer to maintain said electromechanical transducer in an "off" condition;
(f) said drive circuit means including means for rapidly altering said electrical potential difference from said "off" condition in response to drive pulses to eject ink droplets from said exit orifice;
(g) said drive circuit means including sensor means for sensing said electrical potential difference and means for terminating said alteration of said electrical potential difference at a predetermined electrical potential difference; and
(h) said drive circuit means further including restore means for applying a restore pulse to said electromechanical transducer to return said electrical potential difference across said electromechanical transducer to said "off" condition.

2. The ink ejector of claim 1 wherein said drive circuit means further includes means to provide a dither pulse to said electromechanical transducer to perturbate the meniscus of ink in said ink chamber exit orifice.

3. The ink ejector of claim 1 wherein said drive circuit means further includes a rise time control resistor and a fall time control resistor.

4. The ink ejector of claim 1 wherein said drive circuit means further includes a discharge limiting resistor.

5. The ink ejector of claim 1 wherein said drive circuit means further includes feedback gain means.

6. The ink ejector of claim 1 wherein said drive circuit means further includes over voltage protection means for the drive circuit.

7. An ink jet ejector array comprising a plurality of ink jet ejectors, each of said ejectors comprising:

(a) an ink chamber;
(b) means for supplying ink to said ink chamber;
(c) an exit orifice in said ink chamber;
(d) an electromechanical transducer provided in operating relationship to ink contained in said ink chamber;
(e) drive circuit means for applying an electrical potential difference across said electromechanical transducer to maintain said electromechanical transducer in an "off" condition;
(f) said drive circuit means including means for rapidly altering said electrical potential difference from said "off" condition in response to drive pulses to eject ink droplets from said exit orifice;
(g) said drive circuit means including sensor means for sensing said electrical potential difference and means for terminating said alteration of said electrical potential difference at a predetermined electrical potential difference; and
(h) said drive circuit means further including restore means for applying a restore pulse to said electromechanical transducer to return said electrical potential difference across said electromechanical transducer to said "off" condition.

8. The ink jet ejector array of claim 7 wherein at least two of said ejectors are connected to a common source of electrical potential.

9. The ink jet ejector array of claim 7 wherein at least two of said drive circuit means include means to provide a dither pulse to said electromechanical transducer, and wherein said dither pulses are provided by a common source.

10. The ink jet ejector array of claim 7 wherein at least two of said restore pulses are provided by a common source.

* * * * *